(No Model.)
J. BOURNE, Jr.
CAR AXLE.
No. 347,563. Patented Aug. 17, 1886.
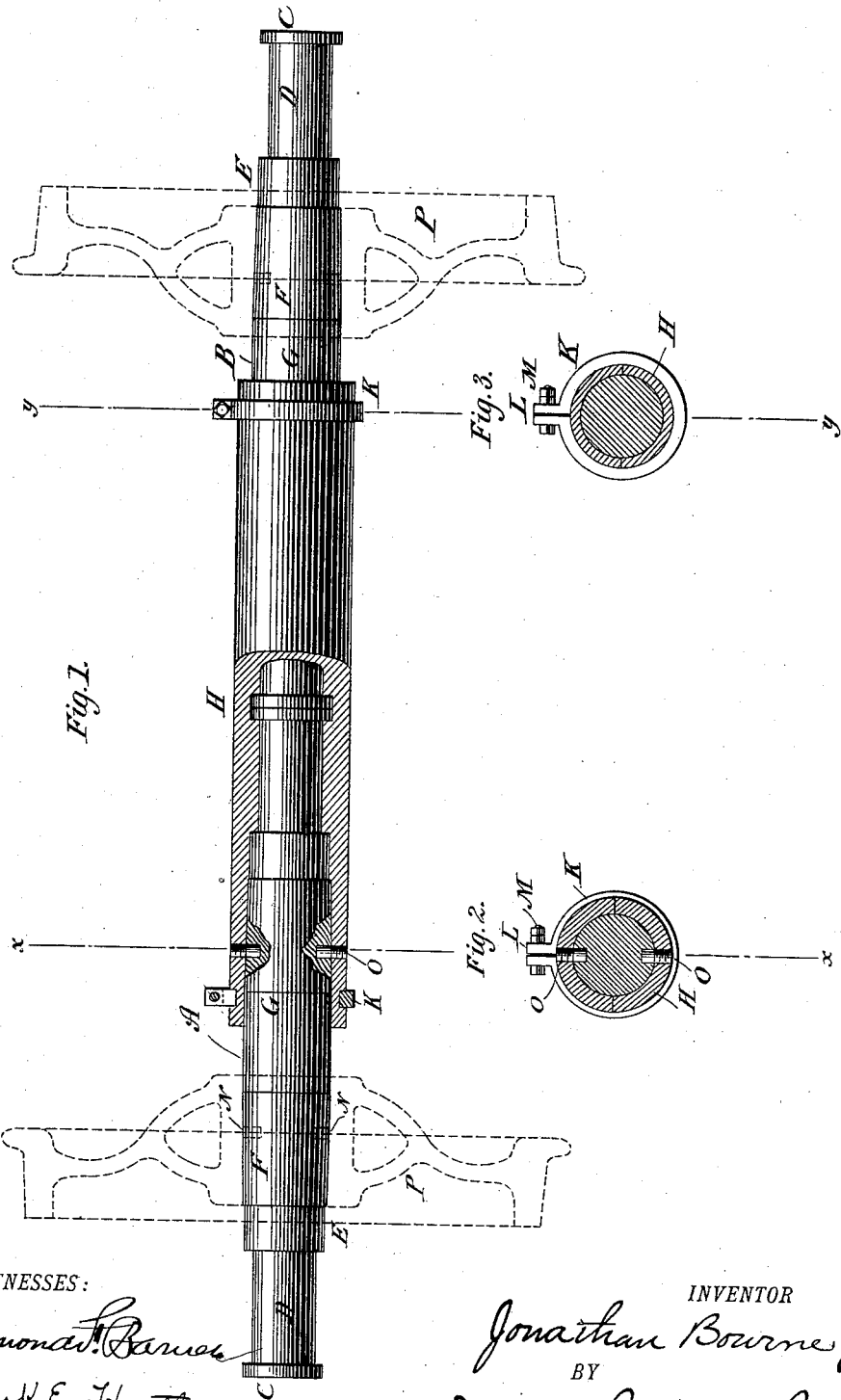
WITNESSES:
Raymond F. Barnes
Frank E. Hartley
INVENTOR
Jonathan Bourne Jr
BY
Duncan, Curtis & Page
ATTORNEYS.

UNITED STATES PATENT OFFICE.

JONATHAN BOURNE, JR., OF PORTLAND, OREGON.

CAR-AXLE.

SPECIFICATION forming part of Letters Patent No. 347,563, dated August 17, 1886.

Application filed June 1, 1886. Serial No. 203,751. (No model.)

*To all whom it may concern:*

Be it known that I, JONATHAN BOURNE, Jr., a citizen of the United States, residing at Portland, in the county of Multnomah and State of Oregon, have invented certain new and useful Improvements in Car-Axles, of which the following is a specification, reference being had to the drawings accompanying and forming a part of the same.

This invention relates to railway-car axles, and is an improvement upon the ordinary forms, which is more particularly designed with the special object of rendering an axle adapted for general and ordinary use capable of being used through a much longer period of service than has heretofore been possible.

Car-axles have ordinarily been made in one piece or solid, the ends being formed with collars, journals, and hub-seats, upon which latter the wheels are shrunk or pressed, so that any defect, whether it be inherent or the result of wear, renders the entire axle unfit for use. In the ordinary axles such defects are very likely to occur, particularly at the journals, as the wear is practically confined to these parts. It becomes, therefore, extremely desirable to provide some way of utilizing an axle which has deteriorated in any manner, and thus save the expense of replacing such axle by a new one. My purpose is to construct an axle in such manner that by a rearrangement of its parts it may be capable of good service even after it has failed one or more times from such defects or deteriorations as commonly occur in the journals. For this purpose I construct an axle in two parts, each of which is a complete axle in itself, though of only one-half the standard length. I place these short axles end to end, and by securing them in any proper manner make a standard axle, to which the wheels may be secured, and which may be applied and used in the ordinary way. An axle thus constructed has two sets or pairs of journals and hub-seats, so that in case of failure or injury to one of the journals it is only necessary to disconnect the two symmetrical parts of the axle, remove the wheel from the defective part, reverse the position of the part, and replace the wheel on its other seat. By this means the capabilities and life of an axle are obviously very greatly extended, and this, too, at a slight additional expense.

This invention may be carried out under a variety of conditions. For instance, I have thus far had reference only to the general class of rigid or solid axles; but axles are also made sectional or divided so that the two halves or ends may turn independently of each other. My invention is, however, applicable to this form as well, it being only necessary to use a form of coupler which will permit an independent rotary movement in the two halves or parts, while preserving in other respects their relative positions fixed.

The details of this device I have shown in the accompanying drawings, illustrating the same by means of a simple but effective device, which embodies the principles of the invention.

Figure 1 is a view, partly in elevation and partly in section, of my improved axle. Fig. 2 is a vertical cross-section of the same on line $x\ x$. Fig. 3 is a similar section on the line $y\ y$.

The axle proper is made up of the two symmetrical parts A and B, and while it is not absolutely necessary, yet it is obviously desirable that each should be one-half the length of a standard axle, in order that when joined by a coupler they may be placed end to end. Each part conforms to the required standard in all other particulars—that is to say, at each end is a collar, C, a journal, D, a shoulder, E, for the dust-bearing, and the slightly-tapered wheel or hub-seat F. The central portion, G, may be straight.

In order to secure the two parts together, I employ a sectional sleeve or coupler, H. The interior of this coupler is formed in such manner as to fit evenly on the axle, and it may be made in two or more longitudinal sections.

The section of the coupler being applied to the axle in the manner indicated in the drawings, the whole is secured by some form of clamping or binding device. For example, circular grooves are provided around the coupler at two or more points, and into these are forced the split rings K, having ears L, which are clamped tightly together by the bolts and lock-nuts M.

If it be desired to make a rigid axle, depressions, as N, are formed in the parts A and B, into which extend lugs or pins O, set in the sections of the coupler. If, on the other hand, it is desirable that the two parts A and B should have a certain independent rotary movement in the coupler, these lugs are dispensed with, or other such provision made as will make this practicable.

The wheels P may be forced onto their seats either before or after the two parts of the axle are combined. Should any defect in a journal subsequently appear, the wheel adjacent thereto is removed, the position of the defective part reversed in the coupler, and the wheel replaced upon the sound end.

I do not confine myself to any particular form of axle, nor to the specified means for uniting or combining the two parts or halves of the same.

What I claim is—

1. A car-axle composed of two parts, each constituting in itself an axle, in combination with a coupler uniting the two parts in substantially the manner set forth.

2. A car-axle composed of two symmetrical parts, in combination with a coupler uniting the two parts end to end, in the manner set forth.

3. A car-axle composed of two symmetrical parts placed end to end, in combination with a longitudinally-divided cylindrical coupler adapted to inclose and unite the two parts and clamps for binding the sections of the coupler together, as set forth.

4. A car-axle composed of two symmetrical parts placed end to end, in combination with a longitudinally-divided cylindrical coupler adapted to inclose and unite the two parts, clamps for binding the sections of the coupler together, and means for locking the parts of the axle against movement in the coupler, as set forth.

JONATHAN BOURNE, Jr.

Witnesses:
FRANK E. HARTLEY,
PARKER W. PAGE.